Patented May 19, 1942

2,283,334

UNITED STATES PATENT OFFICE 2,283,334

VULCANIZATION OF RUBBER

Arthur M. Neal, Wilmington, Del., and Bernard M. Sturgis, Pitman, N. J., assignors to E. I. du Pont de Nemours & Company, Wilmington, Del., a corporation of Delaware No Drawing. Application July 18, 1940,
Serial No. 346,140

23 Claims. (Cl. 260—785)

This invention relates to the vulcanization of rubber and more particularly to new combinations of accelerators for the vulcanization of rubber.

It has been proposed to accelerate the vulcanization of rubber with a combination of accelerators of which one is designated the primary accelerator and the other is designated a secondary accelerator. The purpose of the secondary accelerator is generally to activate the primary accelerator. The use of secondary accelerators as activators for acidic type primary accelerators, such as the mercapto-thiazoles, has presented particularly difficult problems due to the tendency of such combinations to prevulcanize or scorch the rubber during processing operations. This is particularly true when it is attempted to use a dithiocarbamate as the secondary accelerator. In general, it has been found impossible to use a dithiocarbamate accelerator as a secondary accelerator with an acidic primary accelerator, such as the mercapto-thiazoles and particularly 2-mercapto-benzothiazole, because of the great activity of such combinations of accelerators. Generally, such combinations of dithiocarbamates and mercapto-thiazoles render the rubber incapable of being processed due to its tendency to pre-vulcanize or scorch. Furthermore, combinations of dithiocarbamates with mercapto-thiazoles and other similar acidic accelerators have been found to impart inferior physical properties to the rubber. The resulting vulcanizates are generally poor in resistance to abrasion and in resistance to aging. Further, such combinations of accelerators usually cause bad reversion of the rubber at the longer cures, which is accompanied by a loss in tensile strength and a deterioration of the physical properties in general.

It is an object of the present invention to provide an improved method of vulcanizing rubber. Another object is to provide vulcanized rubber of improved properties. A further object is to improve the vulcanization of rubber by employing, as accelerators therein, new combinations of accelerators which are sufficiently safe at processing temperatures for commercial utilization and which are at the same time very active at normal vulcanization temperatures. A still further object is to provide a new combination of accelerators for the vulcanization of rubber which produces vulcanized rubber of improved properties. Other objects are to provide new compositions of matter and to advance the art. Still other objects will appear hereinafter.

The above and other objects may be accomplished in accordance with our invention, which comprises employing, as accelerators for the vulcanization of rubber, a 2-mercapto-thiazoline accelerator, as a primary accelerator, and a dithiocarbamate accelerator, as a secondary accelerator. We have found that, when such accelerators are employed together for accelerating the vulcanization of rubber, novel results are obtained, which are different than would be expected from the results which have been obtained when it has been attempted to employ the dithiocarbamates with mercapto-thiazoles, such as 2-mercapto-benzothiazole, and similar acidic type accelerators. We have found that the 2-mercapto-thiazoline accelerators can be activated with dithiocarbamate accelerators so that stocks will be obtained, which can be processed safely but which will produce vulcanizates possessing exceptionally good moduli and tensile properties after vulcanizing at the usual vulcanizing temperatures. In general, the curing curves show a remarkable plateau effect and the vulcanizates show very little or no reversion. Moreover, rubber, vulcanized by the joint employment of the accelerators of our invention, has very good resistance to deterioration. In particular, it is resistant to that deterioration normally caused by exposure to high temperatures. Vulcanized rubber compounds, prepared in accordance with our invention, also possess excellent resistance to abrasion, excellent resistance to flex-cracking and excellent resistance to tear, both at ordinary atmospheric temperatures and at higher temperatures. The tensiles, determined at 100° C., are excellent.

The dithiocarbamate accelerators of our invention may be represented by the formula

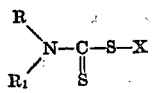

wherein X represents an organic group or a salt forming group or element, R represents hydrogen or an organic radical and $R_1$ represents an organic radical. While either or both of R and $R_1$ may represent aromatic radicals, preferably, at least one of R and $R_1$ represents an aliphatic and, particularly, an alkyl radical. We particularly prefer that R and $R_1$ each represents an aliphatic and, specifically, an alkyl radical. In some cases, it will be preferred that R and $R_1$ together represent a saturated carbon chain having the terminal carbon atoms of the chain directly bonded to the nitrogen to form a heterocyclic ring such as pentamethylene and hexamethylene. The dithiocarbamate accelerators, which may be employed in accordance with our invention, will include amine salts, metal salts, carbamyl and other acyl derivatives, esters and sulfides of the various dithiocarbamic acids. The sulfides of the dithiocarbamic acids will be designated hereinafter by the more commonly employed names, as thiuram sulfides.

By the term "alkyl," as employed hereinafter and in the claims, we mean an aliphatic radical which consists of carbon and hydrogen and which contains no aromatic rings. By the term "aliphatic," we means that the radical may contain aromatic, as well as non-hydrocarbon substituents.

In order to illustrate the remarkable properties that can be obtained when rubber is treated according to our invention, results of tests, in which combinations of various dithiocarbamates with 2-mercapto-thiazolines have been used, are here described.

A particularly valuable class of activators for 2-mercapto-thiazolines consists of carbamyl derivatives of dithiocarbamic acids. In order to show the extreme safety of these combinations at processing temperatures together with the very desirable properties obtainable at vulcanizing temperatures, the following stocks were prepared.

|  | Stock | | |
|---|---|---|---|
|  | A | B | C |
| Smoked sheets | 100 | 100 | 100 |
| Channel black | 25 | 25 | 25 |
| Zinc oxide | 5 | 5 | 5 |
| Stearic acid | 3 | 3 | 3 |
| Sulfur | 3 | 3 | 3 |
| 2-mercapto-thiazoline | 1 | 0.5 | ----- |
| 2-mercapto-benzothiazole | ----- | ----- | 0.5 |
| Phenyl methyl carbamyl dimethyl dithiocarbamate | ----- | 0.25 | 0.25 |

Stock C, in which 2-mercapto-benzothiazole is used as the primary accelerator, was run for purposes of comparison with corresponding stock B in which 2-mercapto-thiazoline is used as the primary accelerator. The results, of the vulcanization tests on these stocks, are given in Table I.

TABLE I

| Min. cured | Temperature | Modulus at 500% elongation (lbs./sq. in.) | | | Tensile at break (lbs./sq. in.) | | |
|---|---|---|---|---|---|---|---|
|  |  | Stock A | Stock B | Stock C | Stock A | Stock B | Stock C |
|  | ° F. |  |  |  |  |  |  |
| 30 | 227 | No cure | 75 | 100 | No cure | 225 | 225 |
| 60 | 227 | 700 | 150 | 150 | 1,700 | 550 | 300 |
| 20 | 274 | 1,575 | 2,625 | 1,900 | 3,700 | 5,050 | 4,125 |
| 30 | 274 | 2,025 | 3,075 | 2,650 | 4,725 | 5,050 | 3,025 |
| 45 | 274 | 2,450 | 3,300 | 2,900 | 5,275 | 4,750 | 2,900 |
| 60 | 274 | 2,700 | 3,300 | 3,250 | 4,900 | 4,600 | 3,250 |
| 90 | 274 | 3,000 | 3,325 | 2,000 | 4,975 | 4,600 | 2,075 |

These results show that, when phenyl methyl carbamyl dimethyl dithiocarbamate is used as a secondary accelerator with 2-mercapto-thiazoline, a powerful activating effect is obtained at 274° F. The modulus of the stock is tremendously increased, being almost doubled in the shorter cures. The tensiles also are raised considerably on the shorter cures. Thus a stock is obtained with a very high modulus, and a flat curing curve showing no reversion. However, this activation is not obtained at the expense of processing safety, for the activated stock is even safer at processing temperatures than the one containing unactivated 2-mercapto-thiazoline. This stock is an ideal one for the preparation of many types of rubber articles. Stock C, in which 2-mercapto-benzothiazole was used as the primary accelerator, does not show the high moduli or tensiles of stock B. Furthermore, bad reversion is apparent with stock C, as the modulus and tensile figures fall off markedly. This stock C is entirely undesirable.

In order to show that the results, obtained above, are not limited to the particular test formula used, the following stocks were prepared.

|  | Stock | | | | | | | |
|---|---|---|---|---|---|---|---|---|
|  | D | E | F | G | H | I | J | K |
| Smoked sheets | 100 | 100 | 100 | 100 | 100 | 100 | 100 | 100 |
| Zinc oxide | 5 | 5 | 5 | 5 | 5 | 5 | 5 | 5 |
| Stearic acid | 3 | 3 | 3 | 3 | 3 | 3 | 3 | 3 |
| Sulfur | 3 | 3 | 3 | 3 | 3 | 3 | 3 | 3 |
| 2-mercapto-thiazoline | 1 | 0.5 | 0.5 | ----- | ----- | ----- | ----- | ----- |
| 2-mercapto-4-methyl-thiazoline | ----- | ----- | ----- | ----- | 0.5 | 0.5 | ----- | ----- |
| Zinc salt of 2-mercapto-thiazoline | ----- | ----- | ----- | ----- | ----- | ----- | 0.5 | 0.5 |
| 2-mercapto-benzothiazole | ----- | ----- | ----- | 0.5 | ----- | ----- | ----- | ----- |
| Phenyl-ethyl-carbamyl-dibutyl-dithiocarbamate | ----- | 0.25 | ----- | ----- | ----- | ----- | ----- | ----- |
| Phenyl-ethyl-carbamyl-dimethyl-dithiocarbamate | ----- | ----- | 0.25 | 0.25 | ----- | ----- | ----- | ----- |
| Phenyl-ethyl-carbamyl-pentamethylene-dithiocarbamate | ----- | ----- | ----- | ----- | ----- | 0.15 | ----- | 0.15 |

The results, of the vulcanization tests on these gum stocks, are given in Table II.

TABLE II

| Min. cured | Temp. cured | Stock D | Stock E | Stock F | Stock G | Stock H | Stock I | Stock J | Stock K |
|---|---|---|---|---|---|---|---|---|---|
| MODULUS AT 600% ELONGATION, LBS./SQ. IN. | | | | | | | | | |
| 30 | °F. 227 | No cure | No cure | No cure | -------- | 75 | 75 | 50 | 75 |
| 45 | 227 | 150 | No cure | No cure | -------- | ----- | ----- | ----- | ----- |
| 20 | 274 | 1,300 | 2,500 | 2,800 | 2,450 | 675 | 1,525 | 550 | 1,250 |
| 30 | 274 | 1,800 | 3,325 | 2,950 | (*) | 875 | 1,700 | 650 | 1,475 |
| 45 | 274 | 2,225 | 3,350 | 2,925 | (*) | ----- | ----- | ----- | ----- |
| 60 | 274 | 2,550 | 3,475 | 2,775 | (*) | 1,325 | 2,075 | 1,025 | 1,600 |
| TENSILE AT BREAK, LBS./SQ. IN. | | | | | | | | | |
| 30 | 227 | No cure | No cure | No cure | -------- | 300 | 300 | 250 | 350 |
| 45 | 227 | 500 | No cure | No cure | -------- | ----- | ----- | ----- | ----- |
| 20 | 274 | 3,200 | 4,425 | 4,775 | 2,450 | 2,550 | 3,825 | 2,275 | 3,875 |
| 30 | 274 | 4,125 | 4,400 | 4,475 | 575 | 2,600 | 4,125 | 2,700 | 3,800 |
| 45 | 274 | 4,325 | 3,650 | 4,300 | 225 | ----- | ----- | ----- | ----- |
| 60 | 274 | 4,025 | 3,600 | 4,075 | 425 | 3,525 | 4,075 | 3,475 | 3,925 |

* Broke short.

These results show that, in a gum stock also, carbamyl dithiocarbamates are powerful activators for 2-mercapto-thiazolines, the modulus, after 20 minutes of cure, being approximately doubled. These combinations of accelerators are, however, extremely safe, giving no cure after 45 minutes at 227° F. Carbamyl dithiocarbamates function equally well with carbon substituted 2-mercapto-thiazolines and metal salts of 2-mercapto-thiazolines, as shown by the results of tests on stocks H, I, J, and K. These combinations of carbamyl dithiocarbamates with 2-mercapto-thiazolines, therefore represent the ideal condition of giving a fast, high modulus, flat curing curve type of cure, coupled with perfect processing safety. The tests on stock G, in which 2-mercapto-benzothiazole was used as the primary accelerator, clearly show that this compound does not give a satisfactory cure when used in conjunction with a carbamyl dithiocarbamate. If carbamyl dithiocarbamate is used with 2-mercapto-benzothiazole, in an amount sufficient to give any substantial amount of activation, the resulting rubber is so badly overcured as to be worthless.

Another class of dithiocarbamate derivatives, that produces excellent results when used as secondary accelerators with 2-mercapto-thiazoles, consists of substituted ammonium salts of dithiocarbamic acids. This class of compounds has not been used to any extent as activators for mercapto-thiazoles and other similar acidic accelerators since the resulting combinations are too active at processing temperatures for use. 2-mercapto-thiazolines, on the other hand, can be activated with safety with ammonium salts of dithiocarbamates.

In order to show the advantages of our invention, the following stocks were compounded and cured.

| | Stock | | | | |
|---|---|---|---|---|---|
| | L | M | N | O | P |
| Smoked sheets | 100 | 100 | 100 | 100 | 100 |
| Channel black | 25 | 25 | 25 | ----- | ----- |
| Zinc oxide | 5 | 5 | 5 | 5 | 5 |
| Stearic acid | 3 | 3 | 3 | 3 | 3 |
| Sulfur | 3 | 3 | 3 | 3 | 3 |
| 2-mercapto-thiazoline | 0.5 | 0.5 | 0.5 | 0.5 | 0.5 |
| Pentamethylene-ammonium-pentamethylene-dithiocarbamate | ----- | 0.1 | ----- | ----- | ----- |
| Hexamethylene-ammonium-hexamethylene dithiocarbamate | ----- | ----- | 0.05 | ----- | ----- |
| Di-lauryl-ammonium-di-lauryl-dithiocarbamate | ----- | ----- | ----- | ----- | 0.1 |

The result of these tests, which were carried out in both a gum stock and a black stock, are given in Table III.

TABLE III

| Min. cured | Temp. cured | Stock L | Stock M | Stock N | Stock O | Stock P |
|---|---|---|---|---|---|---|
| MODULUS AT 600% ELONGATION, LBS./SQ. IN. | | | | | | |
| 30 | °F. 227 | 225 | 350 | No cure | 25 | 75 |
| 45 | 227 | 325 | 750 | 425 | 150 | 350 |
| 20 | 274 | 1,875 | 2,825 | 2,600 | 675 | 1,075 |
| 30 | 274 | 2,550 | 3,475 | 3,375 | 925 | 1,625 |
| 45 | 274 | 3,075 | 3,875 | 3,825 | 1,275 | 1,975 |
| 60 | 274 | 3,350 | 4,100 | 3,975 | 1,450 | 2,175 |
| TENSILE AT BREAK, LBS./SQ. IN. | | | | | | |
| 30 | 227 | 475 | 525 | No cure | 475 | 375 |
| 45 | 227 | 525 | 1,025 | 825 | 1,350 | 2,150 |
| 20 | 274 | 2,925 | 4,225 | 3,550 | 2,625 | 3,400 |
| 30 | 274 | 3,625 | 4,950 | 4,475 | 3,250 | 3,975 |
| 45 | 274 | 4,425 | 5,075 | 4,600 | 3,725 | 3,800 |
| 60 | 274 | 4,850 | 4,825 | 4,450 | 3,850 | 3,825 |

By comparing stocks L, M, and N, it can be seen that, if a small amount of a substituted ammonium salt of a dithiocarbamic acid is added to stock L, the modulus and tensile figures, at curing temperatures, are considerably increased. Even though this class of compounds is considered among the most active as rubber accelerators, yet its members can be used with safety in combination with a 2-mercapto-thiazoline, the resulting stocks (M and N) showing no tendency to prevulcanize during processing. It can also be noted that no reversion in the modulus is present at 274° F., but rather the modulus steadily increases throughout the cure. The same effects are noted in stocks O and P, in which a gum type formula was used.

Another extremely active class of rubber accelerators are the metal salts of dithiocarbamic acids. The activity of these compounds is so great that they can seldom be used with mercapto-thiazoles or other similar types of accelerators, since the resulting rubber stocks are prone to prevulcanize or "scorch" during the processing operation. 2-mercapto-thiazolines are of such a character, however, that they can be safely activated with metal salts of dithiocarbamates. In order to show the safety of these combinations at the processing temperatures together with the desirable properties obtainable at vulcanizing temperatures, the following stocks were prepared.

|  | Stock | | | | | | |
|---|---|---|---|---|---|---|---|
|  | L | Q | R | O | S | T | U |
| Smoked sheets | 100 | 100 | 100 | 100 | 100 | 100 | 100 |
| Channel black | 25 | 25 | 25 |  |  |  |  |
| Zinc oxide | 5 | 5 | 5 | 5 | 5 | 5 | 5 |
| Stearic acid | 3 | 3 | 3 | 3 | 3 | 3 | 3 |
| Sulfur | 3 | 3 | 3 | 3 | 3 | 3 | 3 |
| 2-mercapto-thiazoline | 0.5 | 0.5 | 0.5 | 0.5 | 0.5 | 0.5 | 0.5 |
| Zinc hexamethylene dithiocarbamate |  | 0.05 | 0.1 |  | 0.05 | 0.1 |  |
| Lead-dibutyl-dithiocarbamate |  |  |  |  |  |  | 0.1 |

In these tests, both gum stocks and stocks containing carbon black, were used. Also, the amount of secondary accelerator has been varied to show that it can be widely varied. The amount of secondary accelerator may be reduced much below the lowest amount here used and still retain its activating effect. Results of these tests are given in Table IV.

TABLE IV

| Min. cured | Temp. cured | Stock L | Stock Q | Stock R | Stock O | Stock S | Stock T | Stock U |
|---|---|---|---|---|---|---|---|---|
| MODULUS AT 600% ELONGATION, LBS./SQ. IN. | | | | | | | | |
|  | °F. | | | | | | | |
| 20 | 227 | No cure | No cure | 75 | No cure | No cure | 175 | No cure |
| 30 | 227 | 225 | No cure | 450 | 25 | 125 | 675 | 25 |
| 20 | 274 | 1,875 | 2,375 | 3,075 | 675 | 1,625 | 2,625 | 1,500 |
| 30 | 274 | 2,550 | 3,125 | 3,725 | 925 | 2,175 | 2,675 | 2,100 |
| 45 | 274 | 3,075 | 3,850 | 4,275 | 1,275 | 2,375 | 2,950 | 2,275 |
| 60 | 274 | 3,350 | 4,100 |  | 1,450 | 2,500 | 3,075 | 2,475 |
| TENSILE AT BREAK, LBS./SQ. IN. | | | | | | | | |
| 20 | 227 | No cure | No cure | 350 | No cure | No cure | 500 | No cure |
| 30 | 227 | 475 | No cure | 725 | 475 | 1,375 | 1,625 | 175 |
| 20 | 274 | 2,925 | 3,425 | 4,800 | 2,625 | 3,975 | 4,325 | 3,775 |
| 30 | 274 | 3,625 | 4,475 | 5,025 | 3,250 | 3,850 | 4,200 | 3,825 |
| 45 | 274 | 4,425 | 4,325 | 4,675 | 3,725 | 4,075 | 3,975 | 4,025 |
| 60 | 274 | 4,850 | 4,575 | 4,225 | 3,850 | 3,425 | 3,900 | 3,575 |

Here again, very high modulus stocks are obtained without accompanying reversion or loss of processing safety.

Another class of chemical compounds, widely used as rubber accelerators, consists of the thiuram sulfides. These also produce very desirable rubber vulcanizates when used in combination with a 2-mercapto-thiazoline. This is illustrated by the following test made on a rubber compound of the composition:

Stock V

| | |
|---|---|
| Smoked sheets | 100 |
| Zinc oxide | 5 |
| Channel black | 25 |
| Stearic acid | 3 |
| Sulfur | 3 |
| 2-mercapto-thiazoline | 0.97 |
| Tetramethyl-thiuram mono-sulfide | 0.03 |

This stock was cured for 30, 45, 60, and 90 minutes at 274° F. and the following test data were obtained.

TABLE V

| Minutes cured at 274° F. | Modulus at 500% elongation, lbs./sq. in. | Tensile at break, lbs./sq. in. |
|---|---|---|
| 30 | 2,450 | 5,025 |
| 45 | 2,875 | 4,925 |
| 60 | 3,000 | 4,450 |
| 90 | 3,275 | 4,400 |

There was no difficulty in processing this stock, but, as shown in the table, when it was cured at 274° F., rubber having very high moduli and tensile strength was obtained.

Tetramethyl thiuram disulfide and dipentamethylene thiuram tetrasulfide were used as activators for 2-mercapto-thiazoline in the following rubber stocks:

|  | Stock $A_1$ | Stock $B_1$ | Stock $C_1$ |
|---|---|---|---|
| Smoked sheets | 100 | 100 | 100 |
| Zinc oxide | 5 | 5 | 5 |
| Stearic acid | 2 | 2 | 2 |
| Phenyl-beta-naphthylamine | 1 | 1 | 1 |
| Sulfur | 3 | 3 | 3 |
| 2-mercapto-thiazoline | 1 | 0.75 | 0.75 |
| Tetramethyl thiuram disulfide |  | 0.025 |  |
| Dipentamethylene thiuram tetrasulfide |  |  | 0.025 |

These stocks were vulcanized at 259° F. for periods of 30, 60 and 120 minutes. The results of modulus and tensile tests on the stocks after vulcanization, are given in the following table:

TABLE VI

| Min. cured | Temp. cured | Stock A₁ 600% modulus | Tensile | Stock B₁ 600% modulus | Tensile | Stock C₁ 600% modulus | Tensile |
|---|---|---|---|---|---|---|---|
| | °F. | | | | | | |
| 30 | 259 | 575 | 3,100 | 1,150 | 3,975 | 1,050 | 4,150 |
| 60 | 259 | 900 | 3,825 | 1,525 | 4,475 | 1,450 | 4,675 |
| 120 | 259 | 1,325 | 4,275 | 1,900 | 4,600 | 1,850 | 4,275 |

It can be seen from these results that both of these thiurams are powerful activators for 2-mercapto-thiazoline, only a very small amount being necessary to double the modulus and greatly increase the tensile on the 30 minute cure. Moreover, these activators do not cause overcuring or reversion when used in these amounts, since the modulus has not started to fall off even after 120 minutes of cure. Furthermore, no difficulty was encountered in processing any of these stocks.

In order to illustrate that metal salts of 2-mercapto-thiazolines can also be effectively activated with the thiuram sulfides, the following stocks were prepared:

| | Stock D₁ | Stock E₁ |
|---|---|---|
| Smoked sheets | 100 | 100 |
| Zinc oxide | 5 | 5 |
| Channel black | 25 | 25 |
| Stearic acid | 3 | 3 |
| Sulfur | 3 | 3 |
| Zinc salt of 2-mercapto-thiazoline | 1 | 0.97 |
| Tetramethyl thiuram monosulfide | | 0.03 |

Results, of tests on these stocks, are given in Table VII.

TABLE VII

| Min. cured | Temp. cured | Stock D₁ 600% Modulus | Tensile | Stock E₁ 600% Modulus | Tensile |
|---|---|---|---|---|---|
| | °F. | | | | |
| 20 | 227 | No cure | No cure | No cure | No cure |
| 30 | 227 | 25 | 125 | No cure | No cure |
| 60 | 227 | 725 | 1,175 | 450 | 1,100 |
| 20 | 274 | 1,850 | 3,075 | 2,550 | 3,525 |
| 30 | 274 | 2,525 | 3,575 | 3,175 | 4,625 |
| 45 | 274 | 3,125 | 4,475 | 3,325 | 4,950 |
| 60 | 274 | 3,375 | 4,475 | 4,000 | 4,875 |
| 90 | 274 | 3,725 | 4,625 | 4,150 | 4,675 |
| 120 | 274 | 4,075 | 4,450 | 4,325 | 4,325 |

It can be seen that the addition of a small amount of a thiuram sulfide gives a substantial increase in the modulus and tensile figures at 274° F. without giving any decrease in safety at processing temperatures.

Acyl derivatives of dithiocarbamic acids, which may conveniently be prepared by reacting an acid chloride with a metal salt of a dithiocarbamic acid, also provides a very desirable class of secondary accelerators for use with 2-mercapto-thiazolines. The desirability of these combinations is illustrated by the results of tests made on the following compounds.

| | Stock L | Stock W | Stock X |
|---|---|---|---|
| Smoked sheets | 100 | 100 | 100 |
| Channel black | 25 | 25 | 25 |
| Zinc oxide | 5 | 5 | 5 |
| Stearic acid | 3 | 3 | 3 |
| Sulfur | 3 | 3 | 3 |
| 2-mercapto-thiazoline | 0.5 | 0.5 | 0.5 |
| Benzoyl-dimethyl-dithio-carbamate | | 0.15 | |
| Benzoyl-pentamethylene-dithio-carbamate | | | 0.15 |

Table VIII gives the results of the tests on compounds.

TABLE VIII

| Min. cured | Cured | Modulus at 600% elongation, lbs./sq. in. | | | Tensile at break, lbs./sq. in. | | |
|---|---|---|---|---|---|---|---|
| | | Stock L | Stock W | Stock X | Stock L | Stock W | Stock X |
| | °F. | | | | | | |
| 20 | 227 | No cure | No cure | No cure | No cure | No cure | No cure |
| 30 | 227 | | 100 | 125 | 475 | 225 | 150 |
| 60 | 227 | | 875 | 850 | | 1,325 | 1,325 |
| 20 | 274 | 1,875 | 2,775 | 2,675 | 2,925 | 3,975 | 3,675 |
| 30 | 274 | 2,550 | 3,225 | 3,275 | 3,625 | 4,050 | 4,200 |
| 45 | 274 | 3,075 | 3,600 | 3,700 | 4,425 | 4,475 | 4,375 |
| 60 | 274 | 3,350 | 3,750 | 3,800 | 4,850 | 4,525 | 4,350 |
| 90 | 274 | 3,650 | 3,875 | 3,825 | 4,825 | 4,275 | 3,825 |

The combinations of accelerators, used in these tests, can be seen to give excellent cures at ordinary vulcanizing temperatures, but to retain good processing safety.

A large number of esters of dithiocarbamic acids have been disclosed in patents and in the literature. Many types of these esters are valuable as activators for 2-mercapto-thiazolines. In order to illustrate their usefulness, the following stocks were prepared.

| | Stock O | Stock Y | Stock Z |
|---|---|---|---|
| Smoked sheets | 100 | 100 | 100 |
| Zinc oxide | 5 | 5 | 5 |
| Stearic acid | 3 | 3 | 3 |
| Sulfur | 3 | 3 | 3 |
| 2-mercapto-thiazoline | 0.5 | 0.5 | 0.5 |
| 2,4-dinitrophenyl-hexamethylene dithiocarbamate | | 0.25 | |
| o-nitro-phenyl-sulfur-chloride ester of dimethyl-dithiocarbamate | | | 0.25 |

Results, of tests on these stocks, are given in Table IX.

TABLE IX

| Min. cured | Cured | Modulus at 600% elongation, lbs./sq. in. | | | Tensile at break, lbs./sq. in. | | |
|---|---|---|---|---|---|---|---|
| | | Stock O | Stock Y | Stock Z | Stock O | Stock Y | Stock Z |
| | °F. | | | | | | |
| 30 | 227 | 25 | 200 | 250 | 475 | 1,300 | 1,700 |
| 20 | 274 | 675 | 1,750 | 2,300 | 2,625 | 4,075 | 2,550 |
| 30 | 274 | 925 | 2,500 | 2,500 | 3,250 | 3,800 | 3,625 |
| 45 | 274 | 1,275 | 2,975 | 2,500 | 3,725 | 3,975 | 3,475 |
| 60 | 274 | 1,450 | 3,100 | 2,500 | 3,850 | 3,425 | 4,650 |

It can be seen that it is possible to obtain vulcanizates having very desirable properties through the use of combinations of dithiocarbamates with 2-mercapto-thiazolines. Such vulcanizates may be processed with safety as is shown by the tests made on the 227° F. cures. The extreme safety of these combinations permits a wide latitude in the selection of the accelerator combinations and in the amounts of both the primary and secondary accelerators used in the combinations.

Not only do the vulcanizates, prepared according to our invention, possess excellent modulus and tensile properties, freedom from reversion, and processing safety, but they are also characterized by many other valuable properties which make them desirable commercial vulcanizates.

One property of vulcanized rubber, which is very important for many applications, such as the construction of inner tubes for tires, is its resistance toward tearing. Vulcanizates, prepared according to our invention, have very excellent tear resistance, as shown in Table X. This excellent tear resistance cannot be obtained by combinations of dithiocarbamates with mercapto-thiazoles, since an overcured condition generally results which causes a deterioration of physical properties. Tests were made, using gum stock O and carbon black stock L as the basic stocks. Stock AA is stock O with the addition of 0.15 part of phenyl-ethyl-carbamyl-pentamethylene-dithiocarbamate; stock BB is stock O with the addition of 0.04 part of hexamethylene-ammonium-hexamethylene-dithiocarbamate; stock CC is stock O with the addition of 0.025 part of zinc-hexamethylene-dithiocarbamate. Likewise, stock DD is stock L with the addition of 0.15 part of phenyl-ethyl-carbamyl-pentamethylene-dithiocarbamate.

TABLE X

*Tear test at 28° C.*

| Min. cured at 274°F. | Stock O | Stock AA | Stock BB | Stock CC | Stock L | Stock DD |
|---|---|---|---|---|---|---|
| 20 | 17 | 28½ | 22½ | 24 | 9 | 38 |
| 30 | 21 | 27½ | 25 | 27 | 16 | 49½ |
| 45 | 24 | 24 | 24 | 26 | 28 | 49 |
| 60 | 25 | 23 | 23½ | 25 | 51 | 40½ |
| 90 | 24½ | 20½ | 23 | 24 | 47 | 41 |

These tests show that, although the modulus is greatly increased by the addition of the secondary accelerator, the stocks are not overcured, since the tear test is equal or superior to that given by the primary accelerator alone.

The ability of rubber to stand up under high temperatures, while in service, is becoming increasingly more important. The rubber industry is therefore desirous of obtaining a rubber vulcanizate having high modulus and tensile figures which will also be resistant to conditions of high temperature without deterioration. The combinations of accelerators of this invention will provide these desired characteristics. This is illustrated by the test results given in Table XI, in which the results of tensile strength determinations made at 100° C. on stocks AA, BB, CC and DD, are presented.

TABLE XI

*Tensiles at break, lbs./sq. in.*

| Min. cured at 274° F. | Stock AA | | Stock BB | | Stock CC | | Stock DD | |
|---|---|---|---|---|---|---|---|---|
| | 28 °C. | 100 °C. | 28 °C. | 100 °C. | 28 °C. | 100 °C. | 28 °C. | 100 °C. |
| 20 | 3,925 | 3,425 | 3,475 | 2,575 | 3,325 | 3,330 | 4,150 | 3,250 |
| 30 | 4,400 | 3,125 | 4,000 | 3,500 | 4,050 | 3,875 | 4,675 | 3,875 |
| 45 | 4,125 | 3,350 | 3,950 | 3,875 | 4,150 | 3,925 | 4,925 | 3,900 |
| 60 | 3,825 | 3,275 | 3,800 | 3,575 | 3,900 | 3,225 | 4,825 | 3,800 |
| 90 | 3,825 | 3,325 | 3,675 | 3,175 | 3,175 | 2,325 | 4,125 | 3,775 |

Rubber, vulcanized by the use of dithiocarbamates as accelerators, is notoriously poor in age and heat resistance. This poor resistance toward deterioration carries over into stocks in which dithiocarbamates are used as activators for mercapto-thiazoles and other similar types of accelerators. These combinations of accelerators are therefore valueless for the preparation of most commercial stocks.

It has been found, however, that, when these dithiocarbamates are used as activators for 2-mercaptothiazolines in accordance with our invention, this deterioration, in age and heat resistance, is not apparent. The resulting vulcanizates withstand deterioration to a remarkable degree. This is illustrated by the results given in Table XII. The tests, recorded in this table, were carried out on the following stocks.

| | Stock | | | |
|---|---|---|---|---|
| | EE | FF | GG | HH |
| Smoked sheets | 100 | 100 | 100 | 100 |
| Zinc oxide | 5 | 5 | 5 | 10 |
| Stearic acid | 2 | 2 | 2 | 2 |
| Sulfur | 3 | 3 | 3 | 2.75 |
| Phenyl-beta-naphthylamine | 1 | 1 | 1 | 1 |
| 2-mercapto-thiazoline | | 0.75 | 0.75 | |
| 2-mercapto-benzo-thiazole | | | | 0.85 |
| Zinc-hexamethylene-dithiocarbamate | 0.2 | 0.02 | | |
| Hexamethylene-ammonium-hexamethylene-dithiocarbamate | | | 0.025 | |

These stocks were cured for 60 minutes at 259° F. and then aged by suspending in an air oven at 100° C. for two days, and also by suspending them in an oxygen bomb at 300 pounds oxygen pressure at 70° C. for 14 days. In Table XII, there are given the original moduli at 500% elongation, tensiles at break, and also the tensiles after the completion of both aging tests.

TABLE XII

| Stock | Original | | After 2 days in 100° C. oven—tensile | After 14 days in 70° C. oxygen bomb—tensile |
|---|---|---|---|---|
| | 500% modulus | Tensile | | |
| EE | 650 | 3,225 | 175 | 450 |
| FF | 950 | 3,925 | 1,775 | 2,800 |
| GG | 875 | 3,225 | 2,550 | 2,825 |
| HH | 900 | 4,050 | 275 | 2,725 |

The results of these tests are rather surprising. As was expected, the stock, containing the dithiocarbamate alone (stock EE), aged very poorly in both types of test. 2-mercapto-benzo-thiazole, however, is noted as being one of the very few accelerators having antioxidant properties. Dinsmore and Vogt-Trans. I, R. I. vol. 4, page 98, show clearly that 2-mercapto-benzo-thiazole and para-nitroso-dimethylaniline are the only two, of a large number of commercial accelerators tested, which also acted as antioxidants. Furthermore, Barron, in the book "Modern Rubber Chemistry"—Hutchinson (1937) on page 194, states that 2-mercapto-benzo-thiazole "has a profound retarding effect on aging." These statements have been borne out by observations in the rubber industry that stocks, cured with 2-mercapto-benzo-thiazole, have very good aging characteristics. The addition of small amounts of a dithiocarbamate, however, greatly lowers the age resistance of the stock. On the other hand, it can be noted, from Table XII, that combinations of dithiocarbamates with a 2-mercapto-thiazoline produce vulcanizates that are greatly superior to those, prepared from 2-mercapto-benzo-thiazole, in resistance to aging in the 100° C. oven, and are somewhat superior in resistance to aging in the oxygen bomb. It therefore appears that rubber vulcanizates, prepared according to our invention, are extremely valuable to the rubber industry since they resist deterioration better than the accelerator formerly adopted as the standard.

Besides the above described valuable properties of vulcanizates, prepared with the accelerator combinations of our invention, these vulcanizates also possess very good resistance to abrasion, flex-cracking, and heat build-up.

Although certain definite combinations of accelerators have been shown, these combinations are illustrative rather than limiting. A great many different 2-mercapto-thiazolines may be used as the primary accelerator with excellent results. These include carbon substituted 2-mercapta-thiazolines in which one or both of the hydrogen atoms, in the 4 or 5 or both the 4 and 5 positions of the ring, are substituted by alkyl groups or hydroxy alkyl groups as illustrated by the formula.

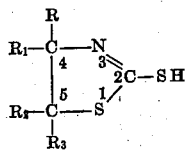

Examples of such substituted 2-mercapto-thiazolines are:

4-ethyl-2-mercapto-thiazoline
4-propyl-2-mercapto-thiazoline
4,4-dimethyl-2-mercapto-thiazoline
5,5-dimethyl-2-mercapto-thiazoline
4-methyl-4-ethyl-2-mercapto-thiazoline
4,4-dimethyl-5-propyl-2-mercapto-thiazoline
4-isopropyl-5-propyl-2-mercapto-thiazoline
4-ethyl-5-propyl-2-mercapto-thiazoline
4-methyl-5-hydroxymethyl-2-mercapto-thiazoline
4-methyl-4-ethyl-5-propyl-2-mercapto-thiazoline
4-ethyl-5-methyl-2-mercapto-thiazoline
4-propyl-5-propyl-2-mercapto-thiazoline
4,5-dimethyl-2-mercapto-thiazoline
4-hydroxyethyl-2-mercapto-thiazoline
4,4,5,5-tetramethyl-2-mercapto-thiazoline Also, various metal salts of these 2-mercapto-thiazolines may be used effectively. These include, among others, Lead salt of 2-mercapto-thiazoline
Calmium salt of 2-mercapto-thiazoline
Iron salt of 2-mercapto-thiazoline
Zinc salt of 4-methyl-2-mercapto-thiazoline
Cadmium salt of 4-methyl-2-mercapto-thiazoline
Zinc salt of 4-ethyl-2-mercapto-thiazoline
Lead salt of 4-propyl-2-mercapto-thiazoline
Cadmium salt of 4,4-dimethyl-2-mercapto-thiazoline
Iron salt of 5,5-dimethyl-2-mercapto-thiazoline
Zinc salt of 4-methyl-4-ethyl-2-mercapto-thiazoline
Cadmium salt of 4,4-dimethyl-5-propyl-2-mercapto-thiazoline
Zinc salt of 4-hydroxyethyl-2-mercapto-thiazoline
Zinc salt of 4,4,5,5-tetramethyl-2-mercapto-thiazoline A large choice of members of the various classes of dithiocarbamic acid derivatives, employable as secondary accelerators, is also possible. For example, the following carbamyl dithiocarbamates are a few of the many that have been found to be very effective in producing the desired results.

Phenyl-methyl-carbamyl-diethyl-dithiocarbamate
Phenyl-methyl-carbamyl-pentamethylene-dithiocarbamate
Phenyl-methyl-carbamyl-dicyclohexyl-dithiocarbamate
Phenyl-ethyl-carbamyl-diethyl-dithiocarbamate
Phenyl-ethyl-carbamyl-dipropyl-dithiocarbamate
Phenyl-ethyl-carbamyl-diamyl-dithiocarbamate
Phenyl-ethyl-carbamyl-hexamethylene-dithiocarbamate
Phenyl-ethyl-carbamyl-dicyclohexyl-dithiocarbamate
Phenyl-ethyl-carbamyl-cyclohexyl-dithiocarbamate
Phenyl-ethyl-carbamyl-tetrahydrofurfuryl-dithiocarbamate
Ethyl-o-tolyl-carbamyl-dimethyl-dithiocarbamate
Ethyl-o-tolyl-carbamyl-pentamethylene-dithiocarbamate
Ethyl-alpha-naphthyl-carbamyl-dimethyl-dithiocarbamate
Ethyl-alpha-naphthyl-carbamyl-pentamethylene-dithiocarbamate
Diphenyl-carbamyl-dimethyl-dithiocarbamate
Diphenyl-carbamyl-hexamethylene-dithiocarbamate
Dimethyl-carbamyl-dimethyl-dithiocarbamate
Dimethyl-carbamyl-pentamethylene-dithiocarbamate
Phenyl-ethyl-carbamyl-phenyl-ethyl-dithiocarbamate
Diphenyl-carbamyl-phenyl-ethyl-dithiocarbamate Likewise, the substituted ammonium salts of dithiocarbamic acids disclosed in the examples, are only a few of the large number that have been tested and which show very good results. Among these are—

Dimethyl-ammonium-dimethyl-dithiocarbamate
Diethyl-ammonium-diethyl-dithiocarbamate
Dipropyl-ammonium-dipropyl-dithiocarbamate
Dibutyl-ammonium-dibutyl-dithiocarbamate
Diamyl-ammonium-diamyl-dithiocarbamate
Diallyl-ammonium-diallyl-dithiocarbamate
o-Methyl-cyclohexyl-ammonium-o-methyl-cyclohexyl-dithiocarbamate
o-Chloro-cyclohexyl-ammonium-o-chloro-cyclohexyl-dithiocarbamate
o-Hydroxy-cyclohexyl-ammonium-o-hydroxy-cyclohexyl-ditniocarbamate
Cyclohexyl-ammonium-cyclohexyl-dithiocarbamate
Dicyclohexyl-ammonium-dicyclohexyl-dithiocarbamate
Ethyl-cyclohexyl-ammonium-ethyl-cyclohexyl-dithiocarbamate
Di-benzyl-ammonium-di-benzyl-dithiocarbamate
Methyl-ethyl-ammonium-methyl-ethyl-dithiocarbamate
Furfuryl-ammonium-furfuryl-dithiocarbamate
Tetra-hydro-furfuryl-ammonium-tetra-hydro-furfuryl-dithiocarbamate
Lauryl-ammonium-lauryl-dithiocarbamate
Alpha-methyl-pentamethylene-ammonium-methyl-pentamethylene-dithiocarbamate
Ammonium-dibutyl-dithiocarbamate
Butyl-pyridinium-dimethyl-dithiocarbamate
Tetramethyl-ammonium-dimethyl-dithiocarbamate
Triphenyl-guanidine salt of dimethyl-dithiocarbamic acid
Diphenyl-guanidine salt of dimethyl-dithiocarbamic acid
Diphenyl-guanidine salt of pentamethylene-dithiocarbamic acid A large number of metal salts of dithiocarbamic acids have been found to be effective secondary accelerators for 2-mercapto-thiazolines and their salts. Examples are the following—

Zinc-dimethyl-dithiocarbamate
Cadmium-dimethyl-dithiocarbamate
Lead-dimethyl-dithiocarbamate
Ferrous-dimethyl-dithiocarbamate
Ferric-dimethyl-dithiocarbamate
Mercuric-dimethyl-dithiocarbamate
Aluminum-dimethyl-dithiocarbamate
Stannous-dimethyl-dithiocarbamate
Cobaltous-dimethyl-dithiocarbamate
Nickelous-dimethyl-dithiocarbamate
Silver-dimethyl-dithiocarbamate
Zinc-pentamethylene-dithiocarbamate
Cadmium-pentamethylene-dithiocarbamate
Lead-pentamethylene-dithiocarbamate
Ferrous-pentamethylene-dithiocarbamate
Ferric-pentamethylene-dithiocarbamate
Aluminum-pentamethylene-dithiocarbamate
Chromium-pentamethylene-dithiocarbamate
Stannous-pentamethylene-dithiocarbamate
Cobaltous-pentamethylene-dithiocarbamate
Nickelous-pentamethylene-dithiocarbamate
Silver-pentamethylene-dithiocarbamate
Cadmium-hexamethylene-dithiocarbamate
Lead-hexamethylene-dithiocarbamate
Ferrous-hexamethylene-dithiocarbamate
Mercuric-hexamethylene-dithiocarbamate
Zinc-diethyl-dithiocarbamate
Cadmium-diethyl-dithiocarbamate
Lead-diethyl-dithiocarbamate Ferrous-diethyl-dithiocarbamate
Zinc-dibutyl-dithiocarbamate
Cadmium-dibutyl-dithiocarbamate
Lead-dibutyl-dithiocarbamate
Ferrous-dibutyl-dithiocarbamate
Ferric-dibutyl-dithiocarbamate
Zinc-dipropyl-dithiocarbamate
Lead-dipropyl-dithiocarbamate
Cadmium-dipropyl-dithiocarbamate
Zinc-cyclohexyl-dithiocarbamate
Cadmium-cyclohexyl-dithiocarbamate
Lead-cyclohexyl-dithiocarbamate
Zinc-dicyclohexyl-dithiocarbamate
Cadmium-dicyclohexyl-dithiocarbamate
Lead-dicyclohexyl-dithiocarbamate
Zinc-phenyl-ethyl-dithiocarbamate
Cadmium-phenyl-ethyl-dithiocarbamate
Lead-phenyl-ethyl-dithiocarbamate
Ferrous-phenyl-ethyl-dithiocarbamate
Zinc-dibenzyl-dithiocarbamate
Cadmium-dibenzyl-dithiocarbamate
Lead-dibenzyl-dithiocarbamate
Zinc-furfuryl-dithiocarbamate
Cadmium-furfuryl-dithiocarbamate
Lead-furfuryl-dithiocarbamate
Cobaltous-furfuryl-dithiocarbamate
Zinc-alpha-methyl-pentamethylene-dithiocarbamate
Cadmium-alpha-methyl-pentamethylene-dithiocarbamate
Lead-alpha-methyl-pentamethylene-dithiocarbamate
Ferrous-alpha-methyl-pentamethylene-dithiocarbamate
Zinc-diallyl-dithiocarbamate
Cadmium-diallyl-dithiocarbamate
Zinc-4-amino-quinolyl-dithiocarbamate
Cadmium-4-amino-quinolyl-dithiocarbamate
Zinc-o-methyl-cyclohexyl-dithiocarbamate
Zinc-o-hydroxy-cyclohexyl-dithiocarbamate
Zinc-o-chloro-cyclohexyl-dithiocarbamate
Zinc-ethyl-cyclohexyl-dithiocarbamate
Zinc salt of dithiocarbamic acid from tetra-hydroquinoline
Zinc-tetrahydrofurfuryl-dithiocarbamate Among the acyl derivatives of dithiocarbamic acids, useful as activators for 2-mercapto-thiazolines and their salts, are—

Furoyl-dimethyl-dithiocarbamate
Furoyl-pentamethylene-dithiocarbamate
Hexahydrobenzoyl-hexamethylene-dithiocarbamate
o-Toluyl-dibutyl-dithiocarbamate
Alpha-naphthoyl-diethyl-dithiocarbamate
Beta-naphthoyl-diamyl-dithiocarbamate
Cuminyl-dibenzyl-dithiocarbamate
Phthaloyl-cyclohexyl-dithiocarbamate
p-Anisyl-dicyclohexyl-dithiocarbamate
Butyryl-dimethyl-dithiocarbamate
Succinyl-methyl-ethyl-dithiocarbamate
Benzoyl-hexamethylene-dithiocarbamate A great many different types of esters of dithiocarbamic acids have been disclosed as rubber accelerators. These are useful as secondary accelerators for 2-mercapto-thiazolines or their salts, according to our invention. As examples, the following are given:

2,4-dinitrophenyl-dimethyl-dithiocarbamate
2,4-dinitrophenyl-dibutyl-dithiocarbamate
o-Nitrophenyl-thio - pentamethylene - dithiocarbamate
o-Nitrophenyl-thio-dicyclohexyl - dithiocarbamate
Perchloromethyl-mercaptan ester of pentamethylene-dithiocarbamic acid
Perchloromethyl-mercaptan ester of ethyl-cyclohexyl-dithiocarbamic acid
Perchloromethyl-mercaptan ester of diethyl-dithiocarbamic acid
Dichlor-diethyl ether ester of pentamethylene-dithiocarbamic acid
Dichlor-diethyl ether ester of dimethyl-dithiocarbamic acid
Ethyl-chloroacetate ester of alpha-methyl-pentamethylene-dithiocarbamic acid
Ethyl-chloroacetate ester of cyclohexyl-dithiocarbamic acid
Chloro-acetone ester of alpha-methyl-pentamethylene-dithiocarbamic acid
Chloro-acetone ester of furfuryl-dithiocarbamic acid
Allyl ester of diethyl-dithiocarbamic acid
Chloroacetamide ester of dicyclohexyl-dithiocarbamic acid Among the thiuram sulfides, giving good results, are—

Tetramethyl-thiuram-disulfide
Tetraethyl-thiuram-disulfide
Tetrapropyl-thiuram-disulfide
Tetrabutyl-thiuram-disulfide
Tetraamyl-thiuram-disulfide
Di-pentamethylene-thiuram-disulfide
Di-hexamethylene-thiuram-disulfide
Di-cyclohexyl-thiuram-disulfide
Tetraethyl-thiuram-monosulfide
Tetrapropyl-thiuram-monosulfide
Tetrabutyl-thiuram-monosulfide
Tetraamyl-thiuram-monosulfide
Di-pentamethylene-thiuram-monosulfide
Di-hexamethylene-thiuram-monosulfide
Tetramethyl-thiuram-tetrasulfide
Dihexamethylene-thiuram-tetrasulfide The combination of accelerators, employed in accordance with our invention, will generally comprise from about 1 to 100 parts of the primary accelerator for each part of the secondary accelerator. When the secondary accelerator is a carbamyl dithiocarbamate, it will generally be preferred to employ from about 1.5 to about 25 parts of the primary accelerator for each part of the carbamyl dithiocarbamate. When an ammonium salt or a metal salt of a dithiocarbamic acid is employed as the secondary accelerator, it will generally be preferred to employ from about 2 to about 100 parts of the primary accelerator to each part of the dithiocarbamic acid salt. When a thiuram sulfide is employed as a secondary accelerator, it will generally be preferred to employ from about 20 to about 50 parts of the primary accelerator to each part of the thiuram sulfide. When an acyl derivative or ester of a dithiocarbamic acid is used as the secondary accelerator, it is preferred to employ from about 1.5 to about 25 parts of the primary accelerator for each part of the secondary accelerator.

Compounding ingredients and fillers, other than those shown in the test formulae and in other proportions, may also be used.

The combinations of accelerators herein described, namely, combinations of dithiocarbamates with 2-mercapto-thiazolines, are capable of producing highly desirable types of vulcanized rubber. These combinations produce stocks having very high moduli and tensiles, a fast flat cure at ordinary curing temperatures, and freedom from reversion. These qualities are not obtained at the expense of processing safety, as the stocks have little tendency to prevulcanize or "scorch." The vulcanized rubber, prepared according to our invention, also has exceedingly good resistance toward tear, abrasion, flex-cracking, and heat build-up. Another characteristic of great value is the great resistance against deterioration by heat or oxidation shown by these vulcanizates. On the whole, the combination of desirable properties, produced by the mixtures of accelerators of our invention, is one that is very difficult to duplicate with any other known accelerator or combination of accelerators, and certainly cannot be duplicated by the combination of dithiocarbamates with any types of accelerators, other than those disclosed as part of our invention.

Combinations of the amine salts, metal salts, acyl derivatives and esters with the 2-mercapto-thiazolines are claimed more specifically in later filed copending applications.

We claim:

1. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating derivative of a dithiocarbamic acid, as a secondary accelerator, there being from about 1 to about 100 parts of the primary accelerator to each part of the secondary accelerator.

2. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating derivative of a dithiocarbamic acid in which the dithiocarbamic acid is derived from a secondary amine, as a secondary accelerator, there being from about 1 to about 100 parts of the primary accelerator to each part of the secondary accelerator.

3. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating derivative of a dithiocarbamic acid in which the dithiocarbamic acid is derived from a secondary amine wherein at least one of the radicals attached to the nitrogen is an aliphatic radical, as a secondary accelerator, there being from about 1 to about 100 parts of the primary accelerator to each part of the secondary accelerator.

4. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating derivative of a dithiocarbamic acid in which the dithiocarbamic acid is derived from a secondary amine wherein at least one of the radicals attached to the nitrogen is an alkyl radical, as a secondary accelerator, there being from about 1 to about 100 parts of the primary accelerator to each part of the secondary accelerator.

5. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating derivative of a dithiocarbamic acid in which the dithiocarbamic acid is derived from a dialiphatic amine, as a secondary accelerator, there being from about 1 to about 100 parts of the primary accelerator to each part of the secondary accelerator.

6. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and an accelerating derivative of a dithiocarbamic acid in which the dithiocarbamic acid is derived from a dialkyl amine, as a secondary accelerator, there being from about 1 to about 100 parts of the primary accelerator to each part of the secondary accelerator.

7. Rubber having incorporated therein, prior to vulcanization, 2-mercapto-thiazoline, as a primary accelerator, and an accelerating derivative of a dithiocarbamic acid, as a secondary accelerator, there being from about 1 to about 100 parts of the primary accelerator to each part of the secondary accelerator.

8. Rubber having incorporated therein, prior to vulcanization, 2-mercapto-thiazoline, as a primary accelerator, and an accelerating derivative of a dithiocarbamic acid in which the dithiocarbamic acid is derived from a secondary amine, as a secondary accelerator, there being from about 1 to about 100 parts of the primary accelerator to each part of the secondary accelerator.

9. Rubber having incorporated therein, prior to vulcanization, 2-mercapto-thiazoline, as a primary accelerator, and an accelerating derivative of a dithiocarbamic acid in which the dithiocarbamic acid is derived from a secondary amine wherein at least one of the radicals attached to the nitrogen is an aliphatic radical, as a secondary accelerator, there being from about 1 to about 100 parts of the primary accelerator to each part of the secondary accelerator.

10. Rubber having incorporated therein, prior to vulcanization, 2-mercapto-thiazoline, as a primary accelerator, and an accelerating derivative of a dithiocarbamic acid in which the dithiocarbamic acid is derived from a secondary amine wherein at least one of the radicals attached to the nitrogen is an alkyl radical, as a secondary accelerator, there being from about 1 to about 100 parts of the primary accelerator to each part of the secondary accelerator.

11. Rubber having incorporated therein, prior to vulcanization, 2-mercapto-thiazoline, as a primary accelerator, and an accelerating derivative of a dithiocarbamic acid in which the dithiocarbamic acid is derived from a dialkyl amine, as a secondary accelerator, there being from about 1 to about 100 parts of the primary accelerator to each part of the secondary accelerator.

12. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and a thiuram sulfide, accelerator, as a secondary accelerator, there being from about 1 to about 100 parts of the primary accelerator to each part of the secondary accelerator.

13. Rubber having incorporated therein, prior to vulcanization, an accelerator of the group consisting of 2-mercapto-thiazolines and metal salts thereof in which the valences of the metal are satisfied by 2-mercapto-thiazoline radicals only, as a primary accelerator, and a thiuram sulfide accelerator, as a secondary accelerator, there being from about 20 to about 50 parts of the primary accelerator to each part of the secondary accelerator.

14. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and a thiuram sulfide accelerator derived from a secondary amine, as a secondary accelerator, there being from about 20 to about 50 parts of the primary accelerator to each part of the secondary accelerator.

15. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and a thiuram sulfide accelerator derived from a dialiphatic amine, as a secondary accelerator, there being from about 20 to about 50 parts of the primary accelerator to each part of the secondary accelerator.

16. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and a tetraalkyl thiuram sulfide accelerator, as a secondary accelerator, there being from about 20 to about 50 parts of the primary accelerator to each part of the secondary accelerator.

17. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and a tetramethyl thiuram sulfide accelerator, as a secondary accelerator, there being from about 20 to about 50 parts of the primary accelerator to each part of the secondary accelerator.

18. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and tetramethyl thiuram monosulfide, as a secondary accelerator, there being from about 20 to about 50 parts of the primary accelerator to each part of the secondary accelerator.

19. Rubber having incorporated therein, prior to vulcanization, an accelerator of the group consisting of 2-mercapto-thiazolines and metal salts thereof in which the valences of the metals are satisfied by 2-mercapto-thiazoline radicals only, as a primary accelerator, and tetramethyl thiuram disulfide, as a secondary accelerator, there being from about 20 to about 50 parts of the primary accelerator to each part of the secondary accelerator.

20. Rubber having incorporated therein, prior to vulcanization, 2-mercapto-thiazoline, as a primary accelerator, and a thiuram sulfide accelerator, as a secondary accelerator, there being from about 20 to about 50 parts of the primary accelerator to each part of the secondary accelerator.

21. Rubber having incorporated therein, prior to vulcanization, 2-mercapto-thiazoline, as a primary accelerator, and a tetraalkyl thiuram sulfide accelerator, as a secondary accelerator, there being from about 20 to about 50 parts of the primary accelerator to each part of the secondary accelerator.

22. Rubber having incorporated therein, prior to vulcanization, 2-mercapto-thiazoline, as a primary accelerator, and tetramethyl thiuram monosulfide, as a secondary accelerator, there being from about 20 to about 50 parts of the primary accelerator to each part of the secondary accelerator.

23. Rubber having incorporated therein, prior to vulcanization, 2-mercapto-thiazoline, as a primary accelerator, and tetramethyl thiuram disulfide, as a secondary accelerator, there being from about 20 to about 50 parts of the primary accelerator to each part of the secondary accelerator.

ARTHUR M. NEAL.
BERNARD M. STURGIS.

CERTIFICATE OF CORRECTION.

Patent No. 2,283,334. May 19, 1942.

ARTHUR M. NEAL, ET AL.

It is hereby certified that error appears in the printed specification of the above numbered patent requiring correction as follows: Page 6, Table XI, line 2 of columns 2, 4, 6 and 8, for "28" read --28° C.--; same line, columns 3, 5, 7 and 9, for "100" read 100° C.--; line 3, same table, columns 2 to 9 inclusive, strike out "° C."; and that the said Letters Patent should be read with this correction therein that the same may conform to the record of the case in the Patent Office.

Signed and sealed this 28th day of July, A. D. 1942.

(Seal)

Henry Van Arsdale,
Acting Commissioner of Patents.